Aug. 3, 1965   C. E. GOWAN   3,198,056
HITCH PIN SAFETY LOCK
Filed Sept. 12, 1963
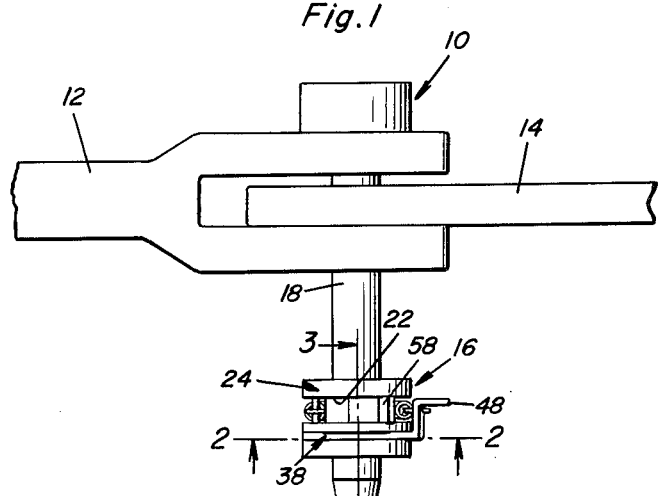
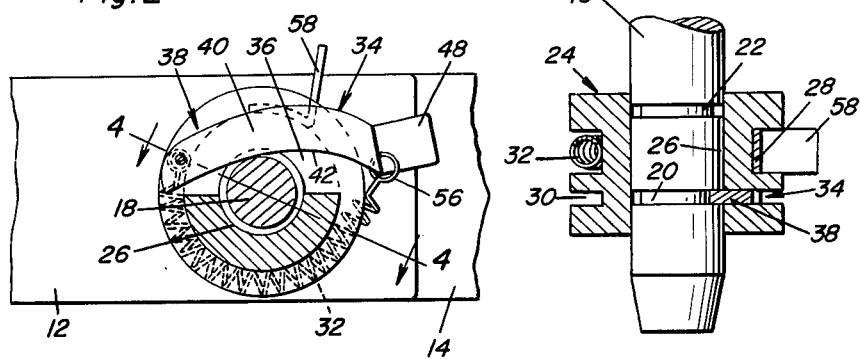
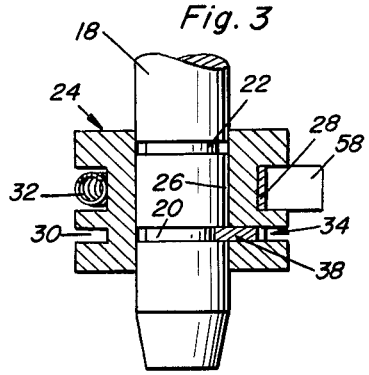
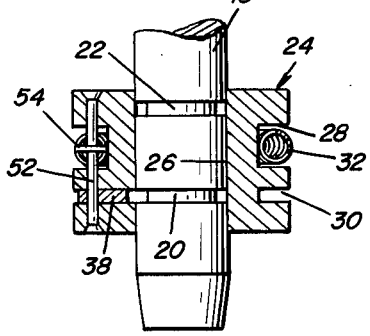
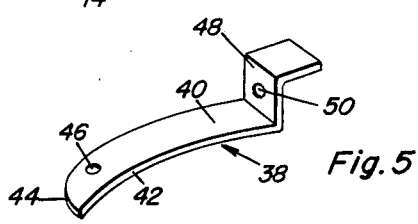
Clarence E. Gowan
INVENTOR.

3,198,056
HITCH PIN SAFETY LOCK
Clarence E. Gowan, 527 Railroad St., Lovington, Ill.
Filed Sept. 12, 1963, Ser. No. 308,485
4 Claims. (Cl. 85—8.8)

This invention relates to a lock device for a coupling pin or shank.

A primary object of the present invention is to provide a safety lock device adapted to be used in connection with a coupling pin which is utilized to detachably couple trailing and towing vehicles or the like, preventing accidental withdrawal of the coupling pin so as to avoid damage to the vehicle and interconnecting equipment.

The safety lock device of the present invention therefore involves a novel construction and assemblage of parts that is simple to manufacture, assemble, economical in cost, and yet serve its purpose with unexpected reliability. Accordingly, an important object of the present invention is to provide such a safety lock device involving a collar slidably received on the coupling pin, the collar being provided with a pair of axially spaced grooves respectively mounting therein a locking lever element and a lever biasing spring. The groove within which the locking lever element is mounted is also provided with a slot through which the locking lever element extends for engagement with the coupling pin. The coupling pin is therefore provided with an annular groove so that when aligned with the slot and the collar, the locking lever element will axially lock the collar member on the coupling pin in order to prevent its withdrawal from the parts being detachably coupled.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a slide elevational view of a coupling pin in one typical installation with the safety lock device installed thereon.

FIGURE 2 is a sectional view taken, substantially through a plane indicated by section line 2—2 in FIGURE 1.

FIGURE 3 is a sectional view taken substantially through a plane indicated by section line 3—3 in FIGURE 1.

FIGURE 4 is a sectional view taken substantially through a plane indicated by section line 4—4 in FIGURE 2.

FIGURE 5 is a perspective view of the locking lever element associated with the safety lock device.

Referring now to the drawings in detail, it will be observed that a detachable coupling generally referred to by reference numeral 10 is provided between a forked member 12 and a tongue 14 projecting from and secured to a towing vehicle and a trailing vehicle respectively or other equipment being coupled. Detachable couplings of this type are commonly utilized in connection with farm equipment or boat trailers. The saftey lock device generally referred to by reference numeral 16 is therefore provided in order to prevent accidental withdrawal of the coupling shank 18 of the detachable coupling 10. The lock device 16 is therefore mounted in axially fixed relation on the shank 18, the shank therefore being provided with annular grooves such as the axially spaced annular grooves 20 and 22 through which the safety device 16 may be locked to the shank at any desired position.

The lock device includes a collar member 24 which is generally circular in shape and provided with an axial bore 26 adapted to slidably receive therethrough the shank 18. The collar member is provided with a pair of axially spaced annular grooves 28 and 30 which may be equal in depth. The groove 28 however, is wider than the groove 30 so that the grooves 28 and 30 may respectively accommodate a biasing spring 32 and releasable locking means generally referred to by reference numeral 34. The groove 30 communicates with the axial bore 26 of the collar member through a slot 36 that extends substantially 180° as more clearly seen in FIGURE 2. It is through this slot 36 that the locking means 34 is able to engage the shank 18. Accordingly, the collar member 24 is adapted to be axially positioned on the shank 18 so that the slot 36 thereof will be aligned with one of the annular grooves 20 or 22 for locking the collar to the shank. In the drawings, the slot 36 is shown aligned with the groove 20.

The releasable locking means 34 includes an arcuate lever element 38 as more clearly seen in FIGURE 5. The lever element is provided with an arcuate locking portion 40 having a locking edge 42. Adjacent one end 44 of the locking lever element, is a pivot mounting aperture 46, while the other end of the locking portion 40 is connected to an offset portion 48 by means of which the lever element may be selectively disengaged from the shank. A spring connecting aperture 50 is formed in the offset portion 48 so that the lever element may be biased into engagement. The locking lever element 38 is therefore disposed within the annular groove 30 of the collar member and pivotally mounted by means of a pivot pin 52 which is secured to the collar member in parallel spaced relation to the shank 18 and extends through both of the grooves 28 and 30 as more clearly seen in FIGURE 4. The pin 52 therefore also extends through the pivot aperture 46 in the lever locking element 38 so that the lever element may be pivotally displaced from the position in engagement with the shank as illustrated in FIGURE 2 with the locking edge 42 thereof disposed in the groove 20 of the shank. The offset portion 48 however, projects beyond the collar member and overlies the groove 28 within which the spring 32 is disposed. One end 54 of the spring 32 is therefore anchored by the pivot pin 52 in the groove 28 and extends therefrom through its groove in a direction opposite to the direction in which the lever element extends so that the other end 56 of the spring 32 may be connected to the lever element through the aperture 50 therein. The lever element will therefore be biased into engagement in a secure and reliable fashion. In order to facilitate release of the lock device through pivotal displacement of the lever element 38 counter-clockwise as viewed in FIGURE 2, a thumb hold element 58 is provided. The thumb hold is secured to the collar within groove 28 and projects therefrom in spaced relation to offset portion 48 of the lever element so that parts 48 and 58 may be grasped between the thumb and a finger in order to release the lock device.

From the foregoing description, the construction, operation and utility of the safety lock device will be apparent. It will therefore be appreciated, that the lock device may be manufactured with simplicity and economy and involves parts that may be easily assembled. Accordingly, the collar member is provided with axially spaced grooves for conveniently seating the locking lever element and biasing spring respectively. The locking lever element is therefore shaped for cooperation with this spring and with the slot in its mounting groove so as to securely lock the collar member to the shank and yet permit selective release thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a shank adapted to detachably couple parts, a safety lock for preventing accidental withdrawal of the shank comprising, a collar member slidably receiving said shank therethrough, said collar member having a pair of axially spaced grooves therein, a slot formed in one of said grooves for alignment with an annular groove formed in the shank, an arcuate lever element, means disposed within one said groove and pivotally mounting the lever element for extension through the slot where intersecting said one groove, said level element being provided with an offset portion projecting from the collar member and overlying the other groove therein, and spring means seated in said other groove and having opposite ends interconnected between the offset portion of the lever element and the pivotal mounting means for biasing the lever element into the annular groove of the shank to lock the collar member thereto.

2. The combination of claim 1 including a hold element fixed to the collar and projecting from said other groove in angularly spaced relation to the offset portion of the lever element, whereby the offset portion and the hold element may be grasped between fingers to release the safety lock.

3. In combination with a shank adapted to detachably couple parts, a safety lock for preventing accidental withdrawal of the shank comprising, a collar member slidably receiving said shank therethrough, said collar member having a pair of axially spaced grooves therein, a slot formed in one of said grooves for alignment with an annular groove formed in the shank, an arcuate lever element, means pivotally mounting the lever element in said one groove of the collar member for extension through the slot therein, said lever element being provided with an offset portion projecting from the collar member and overlying the other groove therein, and coil spring means disposed in said other groove and having opposite ends interconnected between the offset portion of the lever element and the pivotal mounting means for biasing the lever element through the slot into the annular groove of the shank to lock the collar member thereto, said pivotal mounting mean comprising a pin mounted by the collar member in parallel spaced relation to the shank and extending through both of said pair of axially spaced grooves, said pin being connected to one of said ends of the coil spring means, said offset portion being connected to the other end of the coil spring means and having a radial extension which may be grasped to manipulate the lever element.

4. In combination with a shank having at least one locking groove formed therein, a lock device comprising, a collar having an opening receiving said shank and a pair of axially spaced, annular grooves, one of said annular grooves adapted to be axially aligned with the locking groove on the shank, a pivot pin mounted by the collar in radially spaced relation to the shank and extending axially through both of said annular grooves, a locking element pivotally mounted by said pivot pin within said one of the annular grooves, said collar being provided with a slot in said one groove through which the locking element extends into the locking groove on the shank, said locking element having an actuating portion projecting radially beyond the collar in axial alignment with the other of the annular grooves, a spring seated in said other of the annular grooves interconnected between the pivot pin and the actuating portion of the locking element and hold means fixed to the collar in angularly spaced relation to the actuating portion for limiting displacement of the locking element against the bias of said spring to release the lock device.

References Cited by the Examiner
UNITED STATES PATENTS 602,724  4/98  Butler _____ 85—8.8

FOREIGN PATENTS 86,984  7/36  Sweden.

CARL W. TOMLIN, *Primary Examiner.*

M. HENSON WOOD, Jr., *Examiner.*